(12) United States Patent
de Boer (10) Patent No.: US 12,320,333 B2
(45) Date of Patent: Jun. 3, 2025

(54) METHOD FOR OPERATING A WIND POWER INSTALLATION, AND WIND POWER INSTALLATION WHEN AN ICE ACCRETION SITUATION OCCURS

(71) Applicant: Wobben Properties GmbH, Aurich (DE)

(72) Inventor: Wolfgang de Boer, Moormerland (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 18/173,562

(22) Filed: Feb. 23, 2023

(65) Prior Publication Data
US 2023/0265830 A1  Aug. 24, 2023

(30) Foreign Application Priority Data
Feb. 24, 2022  (EP) .................................. 22158572

(51) Int. Cl.
*F03D 7/02* (2006.01)
*F03D 7/04* (2006.01)
*F03D 80/40* (2016.01)

(52) U.S. Cl.
CPC ......... *F03D 7/0224* (2013.01); *F03D 7/0264* (2013.01); *F03D 7/04* (2013.01); *F03D 80/40* (2016.05); *F05B 2270/303* (2013.01); *F05B 2270/328* (2013.01)

(58) Field of Classification Search
CPC .............................. F03D 80/40; F03D 7/0224
See application file for complete search history.

(56) References Cited

U.S. PATENT DOCUMENTS

| 11,946,452 | B2 * | 4/2024 | Hong | F03D 7/0224 |
| 12,092,085 | B2 * | 9/2024 | Messing | F03D 80/40 |
| 2014/0003939 | A1 * | 1/2014 | Adams | F03D 7/0224 416/1 |

(Continued)

FOREIGN PATENT DOCUMENTS

| CA | 3009204 A1 * | 12/2018 | F03D 7/028 |
| EP | 2559894 A1 * | 2/2013 | F03D 7/0224 |

(Continued)

OTHER PUBLICATIONS

English translation of WO2020182661A1 (Year: 2020).*

*Primary Examiner* — Sabbir Hasan
*Assistant Examiner* — Wesley Le Fisher
(74) *Attorney, Agent, or Firm* — Seed IP Law Group LLP (57) ABSTRACT

A method for operating a wind power installation, the wind power installation including an aerodynamic rotor having rotor blades of adjustable blade angle, being controlled by an operation control system, and being configured to generate an installation power, comprises activating a blade-angle adaptation routine when an ice accretion situation occurs, when ice accretion on the rotor blades has been detected or is expected, modifying a collective blade angle of the rotor blades using the blade-angle adaptation routine to adapt the rotor blades to an altered aerodynamic situation caused by the ice accretion, in order to increase the installation power, and selecting an aerodynamically improved blade angle as a modified collective blade angle and specifying the aerodynamically improved blade angle as an iced-blade angle.

20 Claims, 4 Drawing Sheets

(56) References Cited

U.S. PATENT DOCUMENTS

| | | |
|---|---|---|
| 2017/0058871 A1 | 3/2017 | Movsichoff et al. |
| 2022/0186714 A1* | 6/2022 | Messing ................. F03D 80/40 |
| 2023/0258154 A1* | 8/2023 | Hong ...................... F03D 80/40 416/39 |

FOREIGN PATENT DOCUMENTS

| | | | |
|---|---|---|---|
| EP | 3421784 A1 | 1/2019 | |
| WO | WO-2020182661 A1 * | 9/2020 | ............. F03D 80/40 |

* cited by examiner

METHOD FOR OPERATING A WIND POWER INSTALLATION, AND WIND POWER INSTALLATION WHEN AN ICE ACCRETION SITUATION OCCURS

BACKGROUND

Technical Field

Embodiments of the present invention relate to a method for operating a wind power installation, particularly in the case of ice accretion, and embodiments of the present invention relate to a wind power installation that uses or has implemented such a method.

Description of the Related Art

Wind power installations, which generate electrical power from wind, are well known. Provided for this purpose is an aerodynamic rotor, having a plurality of rotor blades, which is driven by the wind. For this purpose, the rotor blades have an aerodynamic profile. Wind power installations are operated insofar as possible in all weather conditions in order to generate as much power, and thus energy, as possible from the wind.

Weather conditions can occur in which ice can form. If ice forms on the rotor blades, this can affect the operation of the wind power installation. In addition to the danger of ice shedding, caused by ice falling from rotor blades, and in addition to the load caused in particular by a possible ice-induced unbalance, there is also the problem that the aerodynamic profile of the rotor blade is modified by the ice accretion.

To counteract this problem, one option is to detect such ice accretion and then shut down the wind power installation, especially to protect the installation and also to protect against ice shedding.

However, it is often undesirable to shut down the wind power installation because this is associated with power losses. Another possibility for countering the problem is therefore to de-ice the rotor blades by means of an appropriate blade heating system. However, such a measure itself requires energy to provide this heating power, which can therefore also be unfavorable. It should also be noted that some ice accretion, which can also include hoarfrost, need not be such a severe restriction that it is necessary to initiate safety measures or de-icing.

Nevertheless, a degradation of the operation of the wind power installation, at least due to the degradation of the aerodynamic profile, including degradation of surface properties of the rotor blades, can be noticeable and undesirable.

BRIEF SUMMARY

Some embodiments address at least one of the aforementioned problems. In some embodiments, a solution is to be created to improve the operation of the wind power installation despite ice accretion.

In some embodiments, a method for operating the wind power installation is thus based on a wind power installation that has an aerodynamic rotor having rotor blades of adjustable blade angle. It is controlled by an operation control system that can specify, for example, a rotational speed of the wind power installation, in particular a relationship between power and rotational speed, and also blade angles to be set.

In addition, the wind power installation is configured to generate an installation power, as is generally known, as this is the main purpose of the wind power installation. An installation power may be considered as an output power that the wind power installation feeds into the electrical supply grid, but a generator power may also be referred to as installation power. An output power differs from a generator power, in particular, in that a portion of the generator power may also be used to operate equipment of the wind power installation. Also, power losses can also occur, such that the generator power is often somewhat greater than the output power.

In some embodiments, however, it is not such details that are important, but rather that a change in power can be taken into consideration, or controlled. In some embodiments, it makes no appreciable difference whether the generator output or, to the same extent, the output power is increased. The description of some embodiments therefore relates in general terms to an installation power.

The method now proposes that a blade-angle adaptation routine is activated when an ice accretion situation occurs. An ice accretion situation is one in which ice accretion on the rotor blades has been detected or is expected. In principle, the blade pitch adaptation routine is activated when ice accretion is present. However, it is also possible that ice accretion cannot be positively identified because no ice sensors are used. In fact, ice accretion can also be deduced from the behavior of a wind power installation in consideration of boundary conditions.

For example, ice accretion may be observed by use of closed-loop control and, if it is found that ice accretion is present, an ice accretion situation is assumed, even if there is no absolute certainty. In particular, a prerequisite for ice accretion is that an ambient temperature of the wind power installation has corresponding values. Ice accretion is not to be expected when the ambient temperature is high, in particular when it is above +2° C. However, ice accretion also does not normally occur at very low ambient temperatures, and this can also be taken into consideration.

If an ice accretion situation exists, the blade-angle adaptation routine is activated and a collective blade angle of the rotor blades is modified in order to adapt the rotor blades to an altered aerodynamic situation caused by the ice accretion, in order to increase the power. In other words, the blade angles of the rotor blades are modified to improve the aerodynamic behavior of the rotor blades.

A collective blade angle is a blade angle that is the same for all rotor blades. In principle, it is possible for the rotor blades to be controlled individually in respect of their blade angle, but still have approximately one common angle, which is referred to as the collective blade angle. The rotor blades may be modified individually by a few degrees relative to this common angle.

It is also possible, however, that the wind power installation does not allow individual blade adjustment and that all rotor blades always have exactly the same angle because they can only be adjusted synchronously. In this case, the collective blade angle is thus the blade angle of all rotor blades at the same time. Of course, this can also be the case if a wind power installation basically does allow individual control of rotor blades, so-called single blade adjustment, but this individual control is not active in an operating state. Even then, all rotor blades have the same angle, namely the collective blade angle. In the following, the collective blade angle may also be referred to simply as the blade angle, as the individual blade angles are not important. For the sake of simplicity, it may be generally assumed for the purposes of explaining some embodiments that the rotor blades are adjusted synchronously.

In any case, it is proposed to activate the blade-angle adaptation routine when an ice accretion situation occurs and to adjust the blade angle of the rotor blade in order thereby to achieve an increase in power. This is because it was recognized that, in the case of ice accretion, the originally intended blade angle is not necessarily the ideal one. In principle, an optimum blade angle is provided for the rotor blades of a wind power installation, in particular in partial-load operation. This optimum blade angle is in particular matched to a particular tip-speed ratio. It is thus matched to the respective assumed wind velocity and rotational speed of the rotor. It is also matched to a specific profile of the rotor blade, which is optimally positioned in the wind with this predetermined optimal blade angle when the tip-speed ratio on which it is based exists.

However, it has now been recognized that this predetermined optimum situation need not necessarily apply in the case of ice accretion. So, in simplified terms, if ice accretion is present, a different aerodynamic profile of the rotor blade is to be expected. However, ice accretion varies greatly from case to case. The ice may be unevenly distributed along the length of the blade. The ice may be unevenly distributed between the nose and the trailing edge of the rotor blade. The ice may also develop differing properties and accordingly result in differences in the roughness of the thus newly created surface. It has been recognized that it is not possible to precisely identify all of these influencing factors, nor is it possible to pre-calculate the respectively ideal blade positions.

It is therefore provided to activate the blade-angle adaptation routine when an ice accretion situation occurs. This is intended to cause the collective blade angle to be modified, such that an increase in power is achieved if at all possible.

It is thus proposed that an aerodynamically improved blade angle is selected as a modified collective blade angle and that this is specified as an iced-blade angle. Thus, if an ice accretion situation occurs, the blade-angle adaptation routine is activated and the ultimate result is an iced-blade angle that achieves an improved aerodynamic situation and thereby delivers an increase in power, insofar as possible. Finally, it is also possible that, despite ice accretion, the selected collective blade angle is already the best. This can then be ascertained by the blade-angle adaptation routine.

According to one aspect, it is proposed that the iced-blade angle is specified as a minimum blade angle to be exceeded, but not undershot, depending on further requirements of an operation control system of the wind power installation.

The aim of specifying the iced-blade angle is to improve the aerodynamic situation. Thus, a blade angle that has been calculated in advance as optimal, but which is not suitable for an iced rotor blade, can be modified to improve the aerodynamic situation. However, it is not intended that the setting of the rotor blade angle by the operation control system be handled entirely by the blade-angle adaptation routine. Rather, it is intended that the operation control system continues to operate in the known manner. This means in particular that if the wind velocity increases, the operation control system must be able to continue to react in the usual way by increasing the blade angle.

The iced-blade angle is therefore proposed as a minimum blade angle, i.e., a lower limit. This allows the operation control system to continue to operate normally, and the blade angle is increased only if this is found to be an aerodynamically suitable blade angle.

According to one aspect, it is proposed that, in the blade-angle adaptation routine, the iced-blade angle is sought by a search in which the collective blade angle is modified and the resulting change in power is monitored, or evaluated.

It is therefore proposed that the collective blade angle is modified by a modification angle, starting from an initial angle. For this purpose, a change in power is detected as a resulting change in the installation power, and the iced-blade angle is selected in dependence on the modification angle and the change in power. The change in power is thus the change in the installation power resulting from the collective blade angle being changed by the modification angle. The initial angle in this case may be the current collective blade angle, i.e., the blade angle that has just been set. Starting from this, the collective blade angle is adjusted and it is to be expected that a change in power occurs. The change in the collective blade angle can be assigned to this change in power and can therefore also be assigned to the modification angle. The iced-blade angle is then selected in dependence on this. It therefore depends on the modification angle and the resulting change in power.

In particular, it is proposed that the iced-blade angle is calculated as the sum of the initial angle and an offset angle that is dependent on the change in power. The initial angle is thus increased by this offset angle, but the offset angle may also be negative. Then the initial angle would be reduced accordingly and the result is the iced-blade angle. It is particularly proposed that the offset angle is proportional to a quotient of the change in power and the modification angle. Thus, the greater the change in power achieved by the changing of the collective blade angle, the larger the offset angle that is selected.

Clearly, a doubled change in power due to a doubled modification angle will not double the value, such this quotient of change in power and modification angle is proposed as a reference. In particular, however, the offset angle is not equated with the modification angle. Rather, a content-based evaluation is proposed to calculate the offset angle. To that extent, the proposed method also differs from a classical hill-climbing method, in which a value is modified until its modification no longer delivers any improvement, and the maximum value has thus been found. Differing from this is at least this aspect, which in particular proposes a calculation of the offset angle, namely in which the proportionality can be specified by a corresponding factor.

The process of modifying the blade angle, registering the modification power and calculating the offset angle may be referred to as a learning run. In this way, the offset angle, and thus the iced-blade angle, is learned. A search may include a plurality of learning runs. However, the search may also be referred to as a learning run. This provides a quick method in which a result can be achieved with one learning run, or few learning runs, such that the actual operation of the installation is only briefly interrupted, or modified, by learning runs.

According to one aspect it is proposed that, in the search performed by the blade-angle adaptation routine for determining the iced-blade angle, the offset angle is selected in dependence on the modification angle of the modification of the collective blade angle and the resulting change in power. This therefore corresponds to the method explained above. For this purpose, it is further proposed that the blade angle is formed as the sum of the offset angle and the initial angle, or of the offset angle and a blade setpoint angle specified by the operation control system for the collective blade angle. It may correspond to the initial angle.

The offset angle in this case is formed from a product of a gain factor and the change in power. Alternatively, the offset angle is formed from the product of the gain factor and a relative change in power, in which case the relative change in power may be formed as a quotient of the change in power and the modification angle.

However, if the offset angle is formed from a gain factor and the change in power, instead of from the relative change in power, then in this case the modification angle may also be included, at least indirectly. It is possible, for example, for fundamentally similar or identical modification angles to be used, and thus for a detected absolute change in power to be assigned quasi automatically, or indirectly, to a modification angle. It is also possible for the modification angle to be formed in dependence on other boundary conditions, such as the initial angle and/or the prevailing wind velocity. In this case, these boundary conditions may be indirectly included in the offset angle.

Thus, if the modification angle depends, for example, on the initial angle, a larger modification angle may be set if the initial angle is small. This can then result in a greater change in power, all other conditions being equal, which can result in a larger offset angle. Consequently, all other boundary conditions being equal, a smaller initial angle results in a larger offset angle because it is indirectly included, on account of the modification angle, in the change in power.

However, it is also possible for the initial angle and/or a prevailing wind velocity to be directly taken into consideration in the gain factor.

Thus, according to one aspect, it is proposed that the gain factor is selected in dependence on a prevailing wind velocity at the wind power installation, in particular such that the lower the wind velocity, the greater is the gain factor selected. This is based on the knowledge that at low wind velocities the amount of power generated is also small, and therefore modifications, in particular modifications of the blade angle, result in only small changes. In order to react more strongly to a changed aerodynamic situation in the case of icing, a greater gain factor is therefore proposed for low wind velocities.

It can also be explained thus, that at low wind velocities a modification of the blade angle would result only in small changes in power and thus only in a small offset angle. Thus, at low wind velocities, the correction would therefore also be small. To compensate for this, a higher gain factor at low wind velocities is proposed.

According to one aspect, it is proposed that, in the search performed by the blade-angle adaptation routine, the collective blade angle is modified incrementally by a modification angle, starting from the initial angle, the modification angle being selected in dependence on the initial angle, in particular such that the smaller the initial angle, the larger is the modification angle selected in terms of magnitude.

Again, this is based on the knowledge that, in the case of small blade angles, namely those set at low wind velocities, a greater blade angle adjustment may be necessary to achieve a noticeable effect. If the search then results in an increase in the iced-blade angle, this can form a new, now larger, initial angle in subsequent operation. If a further search is then executed, the larger initial angle results in a smaller modification angle. Thus, the modification angle decreases with further searches. An iterative behavior can thus result.

It is also to be noted here that the modification of the blade-angle is performed in the search by the blade-angle adaptation routine in order to determine the iced-blade angle in dependence on it. The fact that, in the search, a larger collective blade angle is selected for smaller initial angles therefore does not necessarily mean that the offset angle, which ultimately results in the iced-blade angle, must also be large for small initial angles. The modification angle is only the basis of the learning run. The offset angle is only calculated from the achieved modification power. The learning run be optimized by an appropriate modification angle.

According to one aspect, it is proposed that, in the search in the blade-angle adaptation routine, with simultaneous monitoring of the output power, starting from an initial angle, the collective blade angle is increased in an increase step and then reduced back to the initial angle. In a reduction step, it is reduced and then increased back to the initial angle. Thus, in both cases there is provision to return to the initial angle after the modifications. In the reduction step, an increase is effected first and then the return, i.e., reduction, whereas in the reduction step there is first a reduction and then an increase for the return.

Here, it was recognized in particular that a systematic error could occur if only ever one of these two variants were to be applied. Therefore, both variants are proposed.

In particular, it is proposed that, in an increase search, first the increase step and then the reduction step are provided and, in a reduction search, first the reduction step and then the increase step are provided. It is thus proposed to differentiate between the sequence of whether the increase step is performed first or whether the reduction step is performed first. This can also avoid or reduce systematic errors.

In particular, it is provided that the increase search and the reduction search are executed alternately and/or repeated at predetermined repetition intervals. In this way, an equal distribution of the searches can be achieved in order thereby to avoid systematic errors.

However, it is also possible for only the increase step to be performed, namely when other minimum blade angles prevent the collective blade angle from being reduced from the initial angle. For example, a sound optimization procedure may already prescribe a minimum blade angle that may not be undershot, and in that case neither an increase search nor a reduction search is then performed, but only an increase step, in which the blade angle is thus increased and then returned to the initial angle.

According to one aspect, it is proposed that, in the search performed by the blade-angle adaptation routine, a modification of the collective blade angle is effected in dependence on specified minimum blade angles. Thus, the minimum blade angles mentioned above are thereby taken into consideration.

In particular, it is proposed that one or more minimum blade angles specified by the operation control system is or are ascertained, and a reduction of the collective blade angle by the modification angle is performed only if none of the ascertained minimum blade angles is undershot, an already specified iced-blade angle not being considered as an ascertained minimum angle. The iced-blade angle is in principle also specified as a minimum angle, but is not taken into consideration here because it is to be modified in the search, or after the search, and is therefore not to be self-inhibiting.

In particular, it is provided that in the search only one increase step is performed at a time, in which the collective blade angle is increased starting from the initial angle and then reduced back to the initial angle. In this way, a search can be performed despite the presence of other minimum blade angles, in particular if these are very close to the initial angle.

According to one aspect, it is proposed that, in the blade-angle adaptation routine, the search for finding the iced-blade angle is repeated at predeterminable time intervals. In particular, it was recognized here that an improved found blade angle is only valid for as long as the wind situation has remained approximately the same. In order also to take changing wind conditions into consideration, a constant repetition of the search is proposed, of course only for as long as an ice situation exists.

The predetermined time intervals are in particular in the range of from 30-600 seconds, in particular in the range of from 60-120 seconds. These values are proposed because at least 30 seconds should be waited in order to leave a sufficiently long time for the wind power installation to operate in a stationary manner without performing a search.

In any case, it has been recognized that at least 5 minutes is a sufficiently long period in which significant changes in operating conditions, in particular significant changes in wind velocity, can be expected. The search should therefore be repeated after no more than 5 minutes.

In particular, it is proposed that the previously determined iced-blade angle is used as the initial angle in repetition of the search. Thus, in repetition of the search, the iced-blade angle that was found, or calculated, during the previous search is used as a new initial angle, starting from which the blade angle, i.e., the collective blade angle, is modified.

The underlying concept here is that a determined, or calculated, iced-blade angle is immediately implemented as a (new) minimum blade angle. The installation control system then modifies the current operating point such that the current blade angle is increased to the new minimum blade angle if it was previously below it. From here, the next search is then started, in order to further improve the minimum blade angle. Preferably, a search is repeated until no more change in power can be achieved. At this point, an optimum iced-blade angle has been found.

In particular, it is proposed that a search comprises at least modifying the collective blade angle, starting from an initial angle, by a modification angle, and modifying the collective blade angle back to the initial angle. In particular, a search is constituted by an increase step or a reduction step, or it is constituted by an increase search or a reduction search.

According to one aspect, it is proposed that, after each search, an offset angle, or the offset angle, is calculated and the previous iced-blade angle is modified by the offset angle, and the offset angle is limited to a maximum offset angle in each case, the maximum offset angle being in particular in the range of from 0.5° to 2°, in particular in the range of from 0.75° to 1.5°, in particular approximately 1°. The iced-blade angle is thus modified by the maximum offset angle after each search. This ensures that, in the event of an unusually pronounced change in power, which may not be entirely due to the modification of the iced-blade angle, there is no excessive modification of the iced-blade angle. Any erroneous modifications to the iced-blade angle may be compensated for by repeated searches. In this way, errors can be averaged out.

According to one aspect, it is proposed that the blade-angle adaptation routine is activated only when ice accretion has been detected and/or an ambient temperature of the wind power installation is in a range in which ice accretion may occur, in particular in the range of below +2° C. In particular, it is proposed that sensing of the ambient temperature is performed and the blade pitch adaptation is effected in dependence on the sensed ambient temperature. It is also or alternatively proposed that the blade-angle adaptation routine is activated only when ice accretion is detected by comparison with an installation characteristic curve.

In particular, it has been recognized here that the blade-angle adaptation routine intervenes significantly in the operation control system and that such intervention is to be avoided when no ice accretion is present. Therefore, activation of the blade-angle adaptation routine is proposed when ice accretion has been detected, for example by an appropriate sensor, or at least when there is not a situation in which ice accretion is precluded. This is particularly the case when the ambient temperature is below +2° C. If the temperature is within this range, ice accretion need not necessarily occur, but it is comparatively likely. In particular, however, ice accretion is not to be expected outside of this range. This is thus taken into consideration for activation of the blade-angle adaptation routine.

One possibility for detecting ice accretion is by comparison with an installation characteristic curve, which is possible without additional sensors, and which is described below. This can thus be implemented as a simple prerequisite for activating the blade-angle adaptation routine. An installation characteristic curve can also be referred to synonymously as a characteristic curve.

According to one aspect, it is proposed that the blade-angle adaptation routine and/or the search are/is executed only when at least one of the following conditions is fulfilled. In particular, it is proposed that a plurality of conditions or, in particular, all conditions, must be fulfilled.

As condition 1, it is checked whether at least a minimum wait time, which in particular is in the range of from 30 seconds to 5 minutes, has elapsed since the last search. This prevents the search from dominating the normal operation of the wind power installation, or at least impairing it too much.

As condition 2, it is proposed that it is checked whether the wind power installation is in an automatic mode in which automatic modifications of an operating point are enabled. In this regard, it was recognized that the blade-angle adaptation routine intervenes autonomously in the operation of the wind power installation, and therefore this should only be enabled if the wind power installation is being operated automatically in automatic mode and thus another intervention can be integrated.

As condition 3, it is proposed that ice accretion is detected by comparison of a current operating point with an installation characteristic curve, if a minimum deviation is reached or exceeded, or if the iced-blade angle is above another minimum blade angle. By comparison with an installation characteristic curve, ice accretion can be easily detected, as will be described below. It is proposed to perform this check continuously, at least before a search, and to start the search only if no ice accretion has been detected. In this way, a simple preliminary check can be implemented.

If it is found, however, that the iced-blade angle is above another minimum blade angle, the ice accretion check is not useful. In this case, it is proposed to perform the search anyway, as it results in the deviation from the installation characteristic curve being kept small.

In other words, a search may be initiated as a result of an excessive deviation from the installation characteristic curve. During the first initiation, the iced-blade angle is set to a small value as the initial value, for example −4°. It is therefore not above another minimum blade angle. If this search now returns a change in the minimum blade angle, and then also a change in the set blade angle, because the search was successful and the efficiency has increased, this will also result in a lesser deviation from the installation characteristic curve. If the search is very successful, the deviation is so small that it is below the minimum deviation.

In this case, however, the blade-angle adaptation routine is not to be stopped because it is the reason for the smallness of the deviation. Rather, in this case the blade-angle adaptation routine is to be continued and, if necessary, the iced-blade angle is to be further improved with additional searches.

As condition 4, it is proposed that a prevailing wind velocity in the region of the wind power installation is above a specifiable minimum wind velocity, in particular above 2 m/s, in particular above 2.5 m/s. If the wind velocity is below this, ice accretion is very unlikely anyway and/or it is not to be expected that the aerodynamic situation can be improved significantly, because at such low wind velocities hardly any power is generated anyway.

As condition 5, it is proposed that a mean collective blade angle is below a specifiable minimum blade-angle limit value, in particular below 30°, in particular below 20°. In this regard, it was recognized that in the case of such large blade angle deviations it is hardly possible to achieve any further improvement of the aerodynamic situation. In particular, this may be due to the fact that the wind power installation is in any case in an operating mode in which it must be curtailed in respect of high wind velocities. In this case, closed-loop power control may be effected, in which the installation is adjusted to nominal power, such that an increase in power through an adapted minimum blade angle is no longer possible.

As condition 6, it is proposed that an azimuth search, for searching an optimal azimuth orientation of the wind power installation, is inactive for a specifiable inactivity time, in particular for at least 10 seconds, in particular for at least 20 seconds. Such an azimuth search may be provided to find an optimal azimuth orientation of the wind power installation. If this azimuth search is active, it also modifies the generated power and would therefore distort the search for the iced-blade angle. Therefore, an azimuth search should not be active for at least 10 seconds, in particular at least 20 seconds.

As condition 7, it is proposed that the current output power complies with a specifiable amount of power fluctuation, in particular that for at least 60 seconds the output power does not differ by more than 15%, 10% or in particular 5% from a moving average value of the output power of 1 minute. In this regard, too, it was recognized that if the power fluctuates too much, which is usually caused by corresponding fluctuations in the wind, it is no longer possible to ensure a reliable evaluation of the change in power in the search.

According to condition 8, it is proposed that the current collective blade angle complies with a specifiable amount of fluctuation of the blade angle, in particular that the collective blade angle does not differ by more than 0.5° from a moving average value of the collective blade angle of the last 30 seconds. Again, this is based on the knowledge that a constant fluctuation of the blade angle indicates a corresponding unsteady situation, in particular correspondingly fluctuating wind velocities. A reliable evaluation of the change in power, in particular the association between the change in the collective blade angle and the change in power, is then no longer possible and the search should therefore be omitted.

In particular, it is proposed that all 8 conditions are to be fulfilled simultaneously.

According to one aspect, it is proposed that checking for ice accretion is effected by comparison with an installation characteristic curve, in which an operating point is compared with an installation characteristic curve, the installation characteristic curve representing a relationship between installation power and wind velocity, and/or a relationship between collective blade angle and wind velocity. Ice accretion is assumed if a minimum deviation from the installation characteristic curve has occurred at a sensed wind velocity. Depending on the installation characteristic curve that is used or relevant, there are two possible deviations in this case.

One is that a current operating point has an installation power that deviates from the installation power of the installation characteristic curve of the sensed wind velocity by at least a power tolerance amount. In this case, therefore, the power tolerance amount is the minimum deviation for which a check is performed. The other deviation is that the current operating point has a collective blade angle that deviates from the collective blade angle of the installation characteristic curve of the sensed wind velocity by at least an angle tolerance amount. In this case, the angle tolerance amount forms the minimum deviation. If one of the deviations is present, ice accretion is assumed.

This is based on the knowledge that such a deviation can only be caused by ice accretion.

According to one aspect, it is proposed that ice accretion is assumed only when the minimum deviation from the installation characteristic curve has occurred at least for a predetermined minimum number of times, it being proposed in particular that the minimum number is in the range of from 3 to 10, in particular the value 5.

Such an installation characteristic curve thus describes a relationship between wind velocity and expected installation power, or a relationship between wind velocity and expected blade angle, the former being envisaged for partial-load operation and the latter for full-load operation.

For a predetermined wind velocity, it is therefore expected that the wind power installation will generate a particular power, which is reflected by first the installation characteristic curve. If the actual power deviates from this, namely by more than a predetermined minimum value that forms the minimum deviation, this may indicate ice accretion.

Conversely, it is assumed that if there is no such an exceedance there is no ice accretion.

Preferably, it is proposed not only to check whether a minimum deviation is present or has been detected on one occasion, because a one-time minimum deviation can have other causes, such as measurement errors. It is therefore proposed to wait for several minimum deviations, in particular 5. If the number of minimum deviations has not been reached, ice accretion is not assumed and therefore no search is started.

In full-load operation, sufficient power is available, namely more power than can be taken up by the wind power installation in the wind. The wind power installation is then kept at nominal power by adjustment of the blade angles. This results in particular blade angles existing at particular wind velocities. This relationship is also known in advance and is reflected in the second installation characteristic curve. If the blade angles differ too much from the blade angles assumed for the respective wind velocities, there is also exceedance of a predetermined minimum value. Thus, a minimum deviation has then occurred. Ice accretion is then also assumed, or if this minimum deviation is not present it is assumed that there is no ice accretion.

Some embodiments include a wind power installation, which has an aerodynamic rotor having rotor blades of adjustable blade angle, is controlled by an operation control system, is configured to generate an installation power and is configured to execute a method according to any one of the aspects explained above.

By means of such a wind power installation, it is thus also possible to achieve the advantages achieve above in connection with at least one aspect of the method explained.

BRIEF DESCRIPTION OF THE SEVERAL VIEWS OF THE DRAWINGS

Embodiments are explained in more detail below by way of example with reference to the accompanying figures.

DETAILED DESCRIPTION

Figure 1:
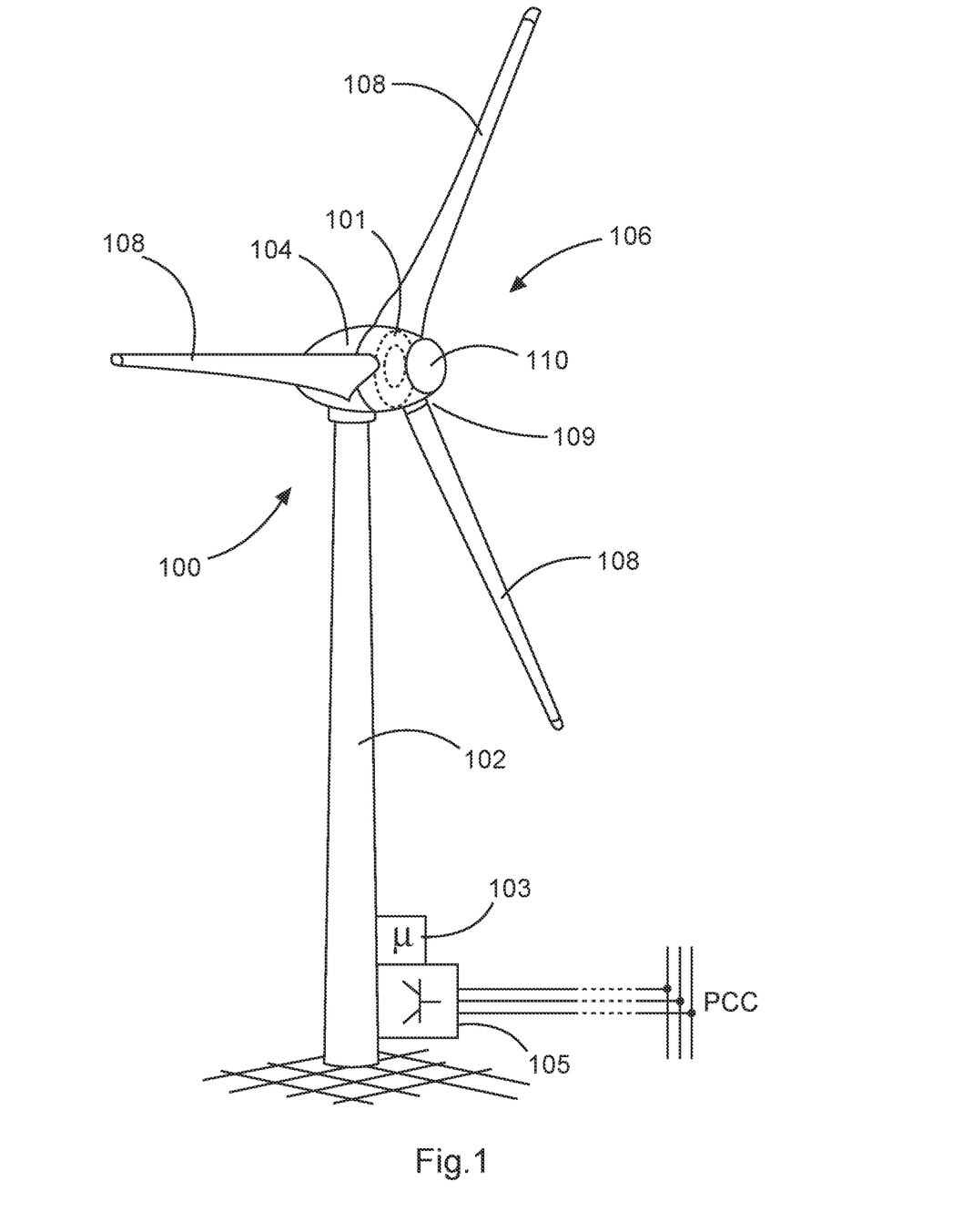
FIG. 1 shows a wind power installation in a perspective representation.

FIG. 1 shows a schematic representation of a wind power installation 100. The wind power installation 100 comprises a tower 102, and a nacelle 104 on the tower 102. Provided on the nacelle 104 there is an aerodynamic rotor 106 that has three rotor blades 108 and a spinner 110. When the wind power installation is in operation, the aerodynamic rotor 106 is caused to rotate by the wind, and thus also rotates an electrodynamic rotor of a generator that is directly or indirectly coupled to the aerodynamic rotor 106. The electrical generator is arranged in the nacelle 104 and generates electrical energy. The blade angles of the rotor blades 108, which are also referred to as pitch angles, can be altered by pitch motors at the rotor blade roots 109 of the respective rotor blades 108.

The wind power installation 100 in this case has an electrical generator 101, which is indicated in the nacelle 104. Electrical power can be generated by means of the generator 101. A feed-in unit 105, which in particular may be realized as a power inverter, is provided for feeding in electrical power. An installation control system 103 is provided for controlling the wind power installation 100 and also the feed-in unit 105.

Figure 2:
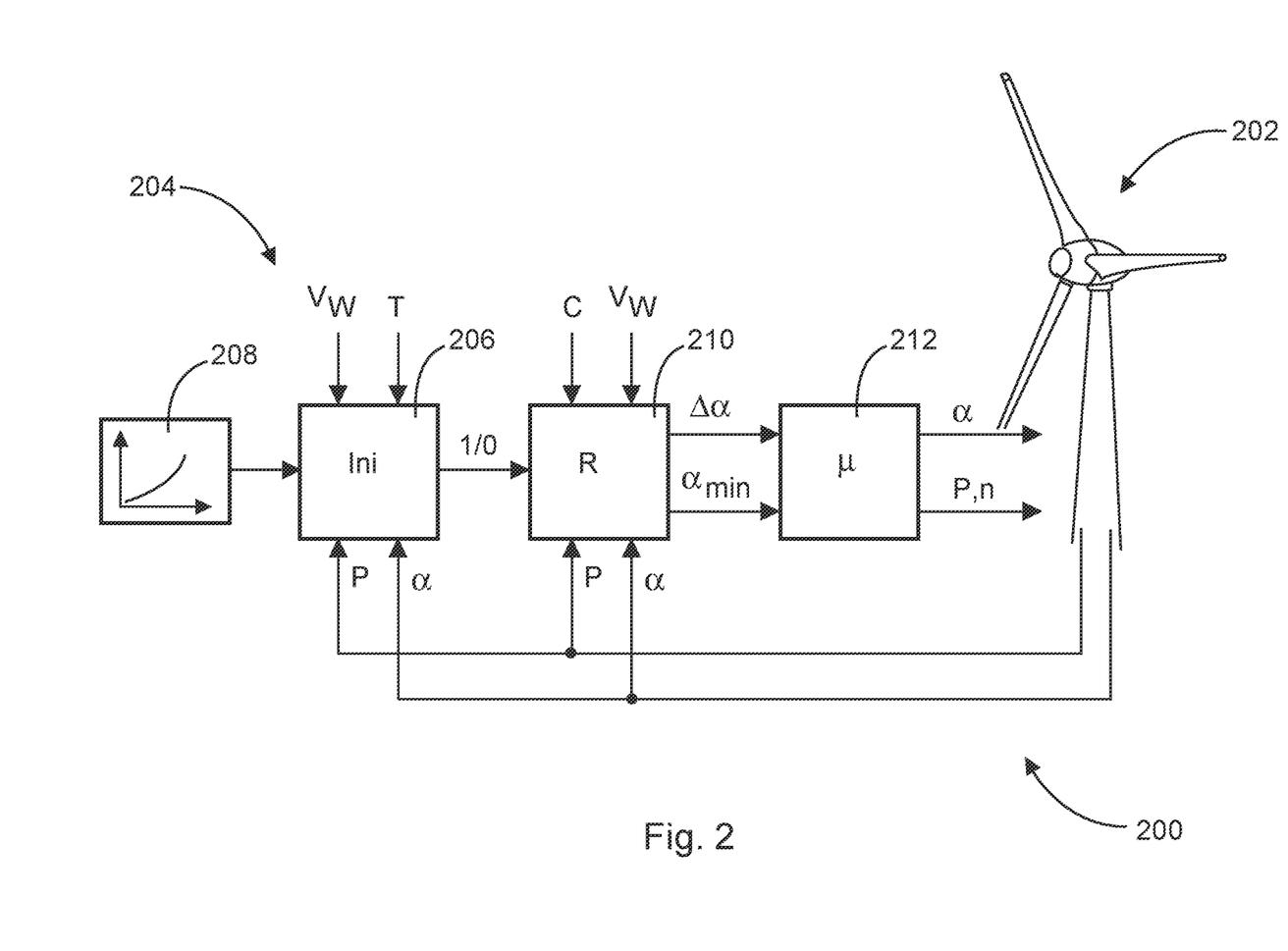
FIG. 2 shows a schematic structure of a proposed method.

FIG. 2 shows a schematic structure 200 to explain a method according to some embodiments. The structure 200 includes a wind power installation 202 and a control structure 204 that is configured to execute a blade-angle adaptation routine, or to schematically explain the principle operation of such a blade-angle adaptation routine.

Provided at the start there is an initialization block 206, which first checks whether an ice accretion situation exists. Only if such an ice accretion situation exists are the further steps executed at all. In order to check this, the initialization block 206 uses an installation characteristic curve 208, which in this case is indicated schematically as an input variable and is thus input into the initialization block. However, it can also already be stored in the initialization block, in particular permanently implemented.

The installation characteristic curve shows a relationship between wind velocity and installation power and, additionally or alternatively, a relationship between wind velocity and blade angle to be set. These two types of installation characteristic curve are intended for different operating states, namely the first for partial-load operation and the second for full-load operation. Accordingly, the correct installation characteristic curve can be selected between the two depending on the operating situation. Of course, it is also possible for these relationships to be stored in an installation characteristic curve, in that the installation characteristic curve is divided into different wind velocity ranges. In particular, it is assumed for this purpose that the partial-load range covers wind velocities for up to a nominal wind velocity, and the full-load range is provided for wind velocities above the nominal wind velocity.

The initialization block also receives the wind velocity $v_W$, the ambient temperature T, the current installation power P and the currently set collective blade angle α as input variables.

The ambient temperature can be used, in particular, to perform a preliminary check. If the ambient temperature is greater than 2° C., it is assumed that there is no icing. However, if the ambient temperature supports the assumption of ice accretion, a comparison with the respective installation characteristic curve can be effected. Depending on the wind velocity, the associated installation power is read of from the installation characteristic curve and compared with the currently available power. If these do not match and differ significantly from each other, ice accretion is assumed. This check is effected in the partial-load range.

In the full-load range, the assigned blade angle is similarly read from the installation characteristic curve in dependence on the wind velocity and compared with the sensed blade angle. If there is too great a deviation, ice accretion is likewise assumed.

In particular, it is assumed that no ice accretion is present if only very slight deviations are determined in this respective comparison.

Depending on the outcome of the initialization block 206, it either outputs a 1, indicating that an ice accretion situation exists, or it outputs a 0, indicating that there is no ice accretion situation.

If an ice accretion situation exists, the adaptation routine block 210 receives the value 1 as an input signal and becomes active accordingly.

For this purpose, the adaptation routine block 210 also receives the current installation power P and the currently set collective blade angle α. The adaptation routine block 210 also receives, as input, as various boundary conditions, which are indicated there, as states C, as input variables. Such boundary conditions may in particular be minimum blade angles existing as a result of other methods such as noise minimization routines. The adaptation routine block 210 receives the current wind velocity $v_W$ as a further input variable.

Then, in consideration of this boundary condition, a modification angle Δα is determined in dependence on the current collective blade angle α. It is this modification angle Δα by which the current system operation is to be temporarily modified and then changed back again. The modification angle Δα may be selected in dependence on the current blade angle, in particular so that the modification angle is selected so as to be large for small current collective blade angles and small for large collective blade angles.

This modification angle Δα is given to the operation control system 212. The operation control system 212 controls the wind power installation and executes very many more operations than are shown in this overview of FIG. 2. However, the operation control system is also used to implement the modification angle Δα. It then accordingly gives a collective blade angle α to the wind power installation, for example to corresponding pitch adjustment means, which are not shown here in detail. The operation control system may also output, for example, power setpoints or rotational speed setpoints, which are additionally indicated as output variables P, n of the operation control system 212 in the diagram of FIG. 2 by way of example. However, these variables are not required for the blade-angle adaptation routine. Moreover, the operation control system 212 could also provide the installation characteristic curve 208 to the initialization block 206.

Thus, a modification angle is specified and implemented by the wind power installation 202 and the operation control system 212. A modified power P then results, and this is detected and sensed in the adaptation routine block 210.

As a next step, the blade angle modification is reversed again, i.e., the applied modification angle $\Delta\alpha$ is no longer applied. Accordingly, the previous collective blade angle is set again and the resulting power is registered again for a time and used for subsequent evaluation.

The evaluation can now be performed or a further modification of the blade angle may be provided, namely this time by subtracting the modification angle $\Delta\alpha$ from the current collective blade angle. The collective blade angle is thus reduced and power is registered again for this purpose. Then, a while later, i.e., after a stable operating situation has been observed, this subtracted modification angle is cancelled again, such that the installation returns to the original collective blade angle in its operation.

During all of these steps, the normal operation control system continues, and this can result in a different operating point being caused by changes in wind velocity and/or wind direction or other events. In that case, the blade-angle change routine is terminated without result, and a new attempt is made later when a stable situation exists again.

The evaluation is then effected in such a way that the respectively achieved changes in power are evaluated. For example, four changes in power may result, namely the first difference after blade angle increase, the second after return to the original blade angle, the third after blade angle reduction and the fourth after return of the blade angle reduction to the original angle. It is also possible, however, for only two changes in power to be considered, for example the first after blade angle increase and then the second after blade angle reduction. This may be considered especially if otherwise specified minimum blade angles do not allow a reduction of the currently set blade angle. Accordingly, such a criterion is checked in the adaptation routine block 210.

An offset blade angle may be calculated in dependence on the power difference determined in this way. Especially if there has been a resultant increase in power, this can be converted into an offset blade angle by use of a gain factor. Such a gain factor in this case naturally also takes the differing physical units into consideration. Details are explained in particular in the flow diagram of FIG. 4.

The result is then an offset blade angle $\alpha_{off}$ which, however, is not represented in FIG. 2, which can be added to the current collective blade angle or to another blade angle to obtain the iced-blade angle. The iced-blade angle is specified as the minimum angle that the operation control system should not undershoot. Accordingly, this adaptation routine block 210 outputs the iced-blade angle $\alpha_{min}$, namely as the result of the blade-angle adaptation routine.

The modification angle $\Delta\alpha$ is thus only generated temporarily for performing the routine and is given to the operation control system 212 for temporary implementation, whereas the iced-blade angle $\alpha_{min}$ is the result and is intended for permanent use in the operation control system 212. It can be used until a new iced-blade angle $\alpha_{min}$ is determined, or until it is cancelled because there is no longer an ice situation.

If a search is performed again after a predetermined time interval, the previously determined iced-blade angle $\alpha_{min}$ can form the initial angle from which the modifications to the collective blade angle are subtracted. This allows the iced-blade angle $\alpha_{min}$ to be further improved.

Figure 3:
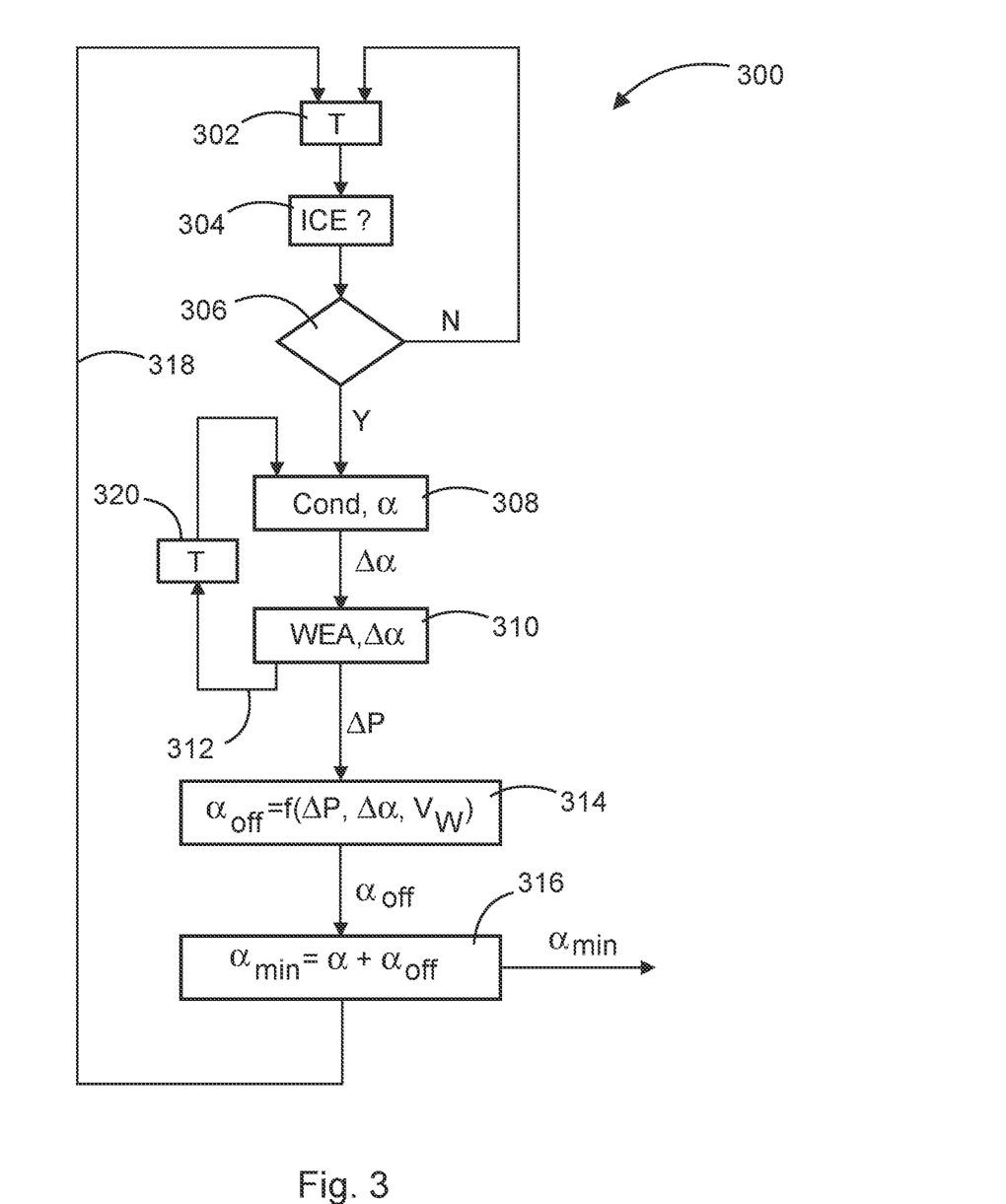
FIG. 3 shows a schematic flow diagram of a proposed method.

FIG. 3 shows a flow diagram 300 for the blade-angle adaptation routine. The diagram begins with a wait block 302, which prevents the routine from being run through continuously. After all, an ice accretion is a process that progresses comparatively slowly, which is why certain wait times are appropriate.

The wait block 302 is followed by the ice detection block 304. In the ice accretion detection block, it is checked whether an ice situation exists. This may be effected by comparing an installation characteristic curve, as described in FIG. 2 especially for the initialization block 206. However, it is of course also possible to use specific ice accretion detection sensors here. It has been recognized, however, that the blade-angle adaptation routine is particularly intended for cases in which ice accretion has not yet occurred to any great extent. It is then also possible that it is not present in every region of the rotor blade, which in turn can result in ice accretion detection sensors that are directed at particular regions of the rotor blade possibly not detecting ice there, while ice is present in other places.

The ice detection block 304 is followed by the interrogation block 306, which results in the routine going back to the wait block 302 in the event that no ice accretion situation exists, and waiting for a time until the routine is restarted.

However, if an ice accretion situation is detected, the method proceeds to the condition block 308, which registers conditions, including the current collective blade angle, and determines a modification angle $\Delta\alpha$ in dependence thereon. This may be determined especially in dependence on the current collective blade angle, in particular such that it is selected so as to be large when the current collective blade angle is small. Consideration is also given to not undershooting otherwise specified minimum blade angles.

The modification angle $\Delta\alpha$ is then given to the implementation block 310, in which the modification angle is implemented in the wind power installation. The current collective blade angle is thus altered by the modification angle $\Delta\alpha$. This can also mean that the current collective blade angle is reduced. There is thus then a modified operation, and for this in particular the changed installation power is also recorded.

This process of specifying and implementing a modification angle $\Delta\alpha$, according to the condition block 208 and the implementation block 210, may be repeated in an inner loop 312. The repetition should be performed only after a repetition time, which is achieved, or illustrated, by the second wait block 320. A repetition time may be in the range of 10 to 60 seconds.

The repetition time may be selected to at least wait for the wind power installation to output a stable power value. In other words, the wind power installation should be operated in a steady-state mode at least each time in order to register the modification power.

In particular, it is provided that at least one changed blade angle $\Delta\alpha$ is taken back again and then the changed power is registered again. In particular, the inner loop is executed twice, or four times, and executing the inner loop 312 eight times is also an option. This is particularly proposed in order to first increase the blade angle and then reset it, then reduce it and reset it again, which is already four executions of the loop.

This may then be repeated, but in reverse order, in that the blade angle is first reduced and reset, then increased and reset. Each time, i.e., upon each execution of the inner loop, a resultant power is also registered, which may be registered as a single modification power.

A total modification power $\Delta P$ may be determined from all the individual modification powers and transferred to the offset calculation block 314. The modification power $\Delta P$ may be, for example, the mean value of these individual modification powers, in which case the individual modification powers must accordingly be registered with a suitable preceding sign for this purpose. In particular, for this purpose it is proposed to subtract the power of the lesser collective blade angle from the power of the greater collective blade angle in order to calculate the change in power.

In other words, if the blade angle is increased, the change in power is calculated as the difference between the power after the increase and the power before the increase. If the blade angle is reduced, the change in power is calculated as the difference between the power before the reduction and the power after the reduction. Thus, the change in power, with the correct preceding sign, is always assigned to a blade angle increase.

In the offset calculation block 314, the blade angle offset is then calculated as a function of this modification power, the modification angle if applicable and the prevailing wind velocity. Details of this are explained in FIG. 4.

The result is therefore this offset angle $\alpha_{off}$, and this is transferred to the output block 316.

In the output block 316, the iced-blade angle $\alpha_{min}$ is calculated, namely, as the sum of the current collective blade angle $\alpha$ and the previously calculated offset angle $\alpha_{off}$. This iced-blade angle is output as $\alpha_{min}$, i.e., it specifies a minimum blade angle that the operation control system should not undershoot. However, it may exceed it in order to continue the operation control system unchanged in this range. The routine then returns, in the outer loop 318, to the wait block 302. After an appropriate wait time specified by the wait block 302, the routine is repeated.

It is also possible that the detection for an ice accretion situation according to the ice detection block 304 is not repeated each time, and instead a middle loop may be provided, which returns from the output block 316 to the condition block 308. However, a further wait block, like the wait blocks 302 and 320, may likewise be provided for such a returning loop, so that this middle loop is likewise not repeated immediately.

Figure 4:
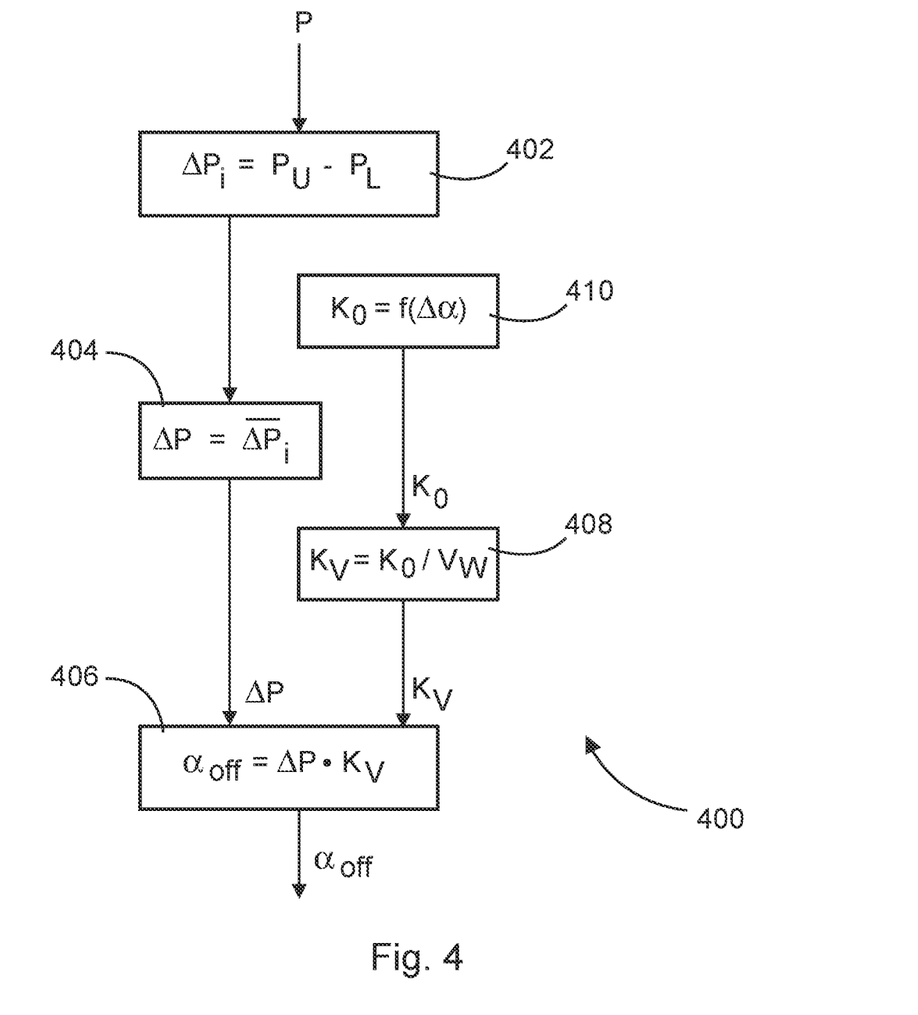
FIG. 4 shows a flow diagram of part of a proposed method.

Further details relating to the calculation of the offset blade angle are explained in the flow diagram 400 of FIG. 4. Basically, the flow diagram 400 of FIG. 4 shows a possible calculation in the offset calculation block 314 of FIG. 3, with consideration of the changes according to the inner loop 312 of FIG. 3.

The flowchart 400 of FIG. 4 thus assumes that installation powers are registered, namely both before and after blade angle modifications are performed. Accordingly, by way of illustration, a change power block 402 is provided, which receives such sensed installation powers P as input values. In the modification power block 402, individual modification powers $\Delta Pi$ are calculated. They are each calculated from a difference between the upper power $P_U$ and the lower power $P_L$. The lower power in this case is the installation power, which is assigned to the smaller blade angle in the case of a blade angle modification. Thus, if the blade angle is increased, the lower power is the initial power before the increase is performed. If the power is reduced, the lower power is the installation power after the reduction. Accordingly, the upper power $P_U$ is the installation power assigned respectively to the larger blade angle, i.e., the installation power after the increase or before the reduction.

Preferably, at least one increase is performed with a reduction back to the initial blade angle, resulting in at least two individual modification powers $\Delta Pi$. Depending on how many blade angle increases and reductions are performed, a corresponding number of individual modification powers $\Delta Pi$ result.

From these, a corresponding mean value can be calculated in the mean-value block 404, which results in the modification power $\Delta P$. This modification power $\Delta P$ has been supplied to the calculation block 406 in order to calculate the offset angle $\alpha_{off}$ in dependence on it.

The offset angle $\alpha_{off}$ is calculated according to calculation block 406 from the modification power $\Delta P$ multiplied by a gain factor $k_v$. Preferably, however, the gain factor $k_v$ is selected in dependence on the situation. In particular, it is proposed that the gain factor $k_v$ is inversely proportional to the wind velocity $v_W$. This is illustrated in the gain calculation block 408.

The gain calculation block 408 assumes a basic factor $k_0$, which is divided by the current wind velocity $v_W$. This results in inverse proportionality. In particular, it is provided that the lower the wind velocity, the greater is the gain factor that is selected. It is also possible, however, that this is not necessarily implemented mathematically by means of inverse proportionality, but other dependences are also possible, in which the gain factor $k_v$ decreases with increasing wind velocity or vice versa, and values or factors, for example, may also be specified as required for this.

The basic factor $k_0$ is determined according to the gain specification block 410. The gain factor results in the modification power $\Delta P$ being converted into an offset angle $\alpha_{off}$. Advantageously, this is also based on the angle change, i.e., the modification angle $\Delta \alpha$, or at least it should be included since it resulted in the modification power $\Delta P$. This can be achieved by the gain factor $k_v$, namely the basic factor $k_0$. This is specified according to the gain specification block 410 in dependence on the modification angle. Here, it is to be taken into consideration that preferably such a modification angle $\Delta \alpha$ is not changed continuously. In particular, it is proposed that this remains constant in terms of magnitude, especially for several executions of the inner loop 312 of FIG. 3. If the outer loop 318, and thus the blade-angle adaptation routine, is executed again, a new modification angle $\Delta \alpha$ can also be determined.

Thus, in particular, it is possible that all individual modification powers $\Delta Pi$, of which the mean value is formed in the mean value block 408, are based on the same modification angle $\Delta \alpha$ in terms of magnitude.

For this purpose, it is proposed to specify the basic factor $k_0$ in dependence on this modification angle $\Delta \alpha$. Such a specified value may also be specified empirically and individually for different values of the modification angle $\Delta \alpha$. It is also possible, however, for the basic factor $k_0$ to be proportional to the modification angle $\Delta \alpha$.

Thus, as a result, the gain factor $k_v$ is dependent on the modification angle $\Delta \alpha$ and the wind velocity $v_W$, and this can therefore be included in the calculations of the offset angle $\alpha_{off}$. Thus, the calculation block 406 ultimately outputs the offset angle $\alpha_{off}$, and from this the iced-blade angle $\alpha_{min}$ can be determined, as explained in the output block 316 of FIG. 3, for example.

However, it is also possible that, in another alternative, the basic factor $k_0$ is not dependent on the modification angle $\Delta \alpha$. Instead, the modification angle $\Delta \alpha$ could be taken into consideration via the modification power by consideration of a relative modification power instead of the modification power ΔP, namely a modification power that is set in relation to the modification angle. This would naturally result in a change of unit in the formulas shown in calculation block 406 and this can be taken into consideration by the gain factor $k_v$.

In some embodiments, the following aspects in particular have been recognized, or are proposed.

It has been recognized that even relatively small amounts of ice on the leading edge, the trailing edge or even on the surfaces of the blades can result in a considerable drop in power. This in turn results in blades even covered with hoar frost delivering only a few 100 kW of power at, for example, 12 m/s, where actually nominal power is generated, and the installations are then stopped due to ice accretion, even with the greatest possible insensitivity of the ice accretion detection using a comparison with an installation characteristic curve.

Trials have shown that increasing the minimum blade angle can significantly mitigate this effect. However, the minimum blade angle that must be set in order to achieve the greatest possible power depends on many factors, such as the rotor blade itself, the current operating characteristic curve, the type of ice, the amount of ice, the distribution of the ice on the rotor blade surface, the wind velocity, the air density, etc. In addition, any increase in the minimum blade angle, e.g., by manual adjustment, results in a loss of power in the ice-free state and is therefore to be avoided.

In order to create a solution to this problem and to generate the maximum possible power at all times under icing conditions, the methods described herein were devised. This is an automatically operating search algorithm (tracker) that adjusts the minimum blade angle under icing conditions such that the installation has the highest possible efficiency (maximum power point). The method may also be referred to as an ice maximum power point ("MPP") tracker.

For this purpose, the ice MPP tracker modifies the minimum blade angle of the wind power installation (installation for short) at certain intervals if the necessary boundary conditions are fulfilled, and checks whether this modification results in an increase or decrease in power. Depending on the result of this blade angle modification, the minimum blade angle learned by the ice MPP tracker up to that point is increased or reduced again. In this way, after typically 30 minutes, a minimum blade angle is set at which the installation generates the maximum possible power in the respective circumstances.

As long as the ice MPP tracker is switched off or the ice accretion detection is inactive due to a correspondingly high outside temperature, a minimum blade angle of, for example, −4° is transmitted to the operation control system. This negative angle therefore initially has no influence on the behavior of the installation.

The blade-angle adaptation routine, which may also be referred to as a state machine, now performs the modification of the blade angle or minimum blade angle in a plurality of steps (states) and subsequently evaluates the associated change in power. There are numerous prerequisites that must be fulfilled if possible in order for a learning run to be performed:

At least 2 minutes must have passed since the last learning run.

The installation is in automatic mode.

The counter for a narrow tolerance band of an ice detection for controlling a blade heating must have reached at least 5, i.e., a minimum deviation from the installation characteristic curve must have been reached at least 5 times, which could trigger a blade heating. This relates to a check for ice accretion, described above, by comparison with an installation characteristic curve.

Or the minimum blade angle of the ice MPP tracker is even greater than the current minimum blade angle, depending on the operating mode of the installation. The latter so that the MPP tracker continues to operate when the power increases through the MPP tracker and is thus again within the narrow tolerance band of the ice accretion detection.

The average wind velocity must be at least 2.5 m/s.

The average blade angle must be less than 20°.

The azimuth MPP tracker has not been active within the last 20s.

For at least 60s the current power must not deviate more than ±10% from the moving average of the power over one minute.

The current blade angle must not deviate more than 0.5° from the moving average of the blade angle over the last 30s.

If all of these conditions are fulfilled, a learning run starts. First, the average power of the last 5s is calculated and stored for subsequent comparison. Since the effect of a blade angle modification on the change in power is less for small blade angles than for blades that have already returned by some degrees, the required angle modification is determined in dependence on the average blade angle of the last 30s. Thus, for example, in the case of a current average blade angle of 0°, an angle modification of, for example, 3° is specified, whereas in the case of a current blade angle of 8° this value is still only 1.5°.

An I/O board 1 in a control cabinet determines the largest minimum blade angle on the basis of different minimum blade angles for different functions such as, for example, α-min (sound optimization), α-min (reserve power) or α-min (sectorial), but without taking the minimum blade angle of the ice MPP tracker into consideration, and transmits this value to an I/O board 2, which may be arranged in the nacelle. If the gap between the current average blade angle and this minimum blade angle is smaller than the previously determined angle modification, the blades are adjusted, for the learning run, to larger angles backward, as otherwise the required angle modification cannot be achieved. If the ice MPP tracker has already set an average blade angle that allows the angle modification to effect even smaller blade angles, the blades are moved alternately, first forward and then back again during a learning run, and first backward and then forward again during the next learning run. This eliminates influences that cause falsification of the result due to a monotonous backward and subsequent forward movement of the blades.

Depending on whether the blades are to be moved forward or backward for the learning run, the I/O board 2 in the nacelle now transmits a setpoint blade angle, which is composed of the average blade angle of the last 30s and the previously determined angle modification for the learning run, to the I/O board 1 in the control cabinet, and waits a few seconds until this setpoint angle has been attained. After this time has elapsed, the MPP tracker now waits typically 30s for the change in power resulting from the angle modification, and during this time monitors whether the current blade angle is within a range of ±0.5° of the specified setpoint. If the blade angle is outside this range, e.g., because the wind has increased and the rotational speed must be controlled, the learning run is terminated without a result. If the blade angle corresponds to the setpoint for the entire duration, after the time has elapsed a calculation of the relative change in power is effected, in which the average power of the last 5s stored before the learning run is compared with the current average power of the last 5s. The result of the current average power and the relative change in power is stored temporarily.

In the next step, the blades are adjusted back to the original blade angle before the learning run. For this purpose, the angle modification added to the current mean value of the blade angle at the beginning of the learning run is subtracted again, with the corresponding preceding sign, from the setpoint blade angle. After a wait time of a few seconds, it is again monitored whether the original blade angle has been re-established. If, as in the first part of the learning run, the blade angle deviates by more than 0.5° from the setpoint value, in this case also the learning run is ended without a result. If the blade angle is within the specified range, after a further 30s wait time has elapsed the change in power is evaluated again by comparing the previously stored average power, at the modified blade angle, with the current average power of the last 5s, at the original blade angle.

Finally, both relative changes in power are supplied with a gain factor and thus directly converted into a blade angle modification with a resolution of 0.01°. The gain factor in this case depends on the wind velocity. The gain factor depends on the wind velocity. The lower the wind velocity, the greater is the gain. This ensures that the relatively smaller changes in power at low wind velocities are compensated.

The calculated angle modifications are now added, with the corresponding preceding sign and in dependence on whether the blades were first moved back and then forward, or vice versa, to the current minimum blade angle of the ice MPP tracker. If, for example, moving the blades back by 3° results in a power increase of 10%, which is quite realistic under icing conditions, this results, for example, in the $\alpha$-min (ice MPPT) being increased by 0.3° for this part of the learning run. If the subsequent moving forward of the blades now results in a 10% drop in power, this likewise causes the $\alpha$-min (ice MPPT) to be increased by 0.3°. If the power drops when the blades are moved back and increases when they are moved forward, in both cases $\alpha$-min (ice-MPPT) is lowered by 0.x° because smaller blade angles result in greater power. In this way, the ice MPP tracker always adjusts the minimum blade angle to a value at which the installation produces the greatest possible power. It can happen that the result of the measurement is falsified due to changes in the wind velocity during the learning run. However, since learning runs are performed at relatively short intervals, which always result in relatively small angle modifications, the effects of the changes in wind velocity are averaged out. In the event of an unusually pronounced change in power, the resulting modification the minimum blade angle is limited to 0.5° for each part of the learning run, such that the minimum blade angle is modified by a maximum of 1.0° during a learning run.

At the end of the learning run, the minimum blade angle of the ice MPP tracker is limited to a maximum of 18°. For small blade angles, limitation to the minimum blade angle is effected in dependence on the current operating mode minus 0.5°. Thus, the minimum blade angle of the ice MPP tracker can become slightly negative with respect to the typical minimum blade angle. This negative bias ensures that changes in the minimum blade angle caused by power fluctuations related to wind velocity result in an albeit very slight influencing of the power when the ice MPP tracker is activated in an ice-free state (optionally possible).

The purpose of the ice MPP tracker is not to determine a minimum blade angle with an accuracy of 0.1°. Rather, it is to modify the blade angle from typically 0° toward 8° to 11°, as this is where, according to early findings, the greatest power can be expected under icing conditions. To prevent the installations from stopping due to ice accretion before the ice MPP tracker has found the optimal operating point, the ice MPP tracker works in relatively short intervals and with relatively large gains, such that blade angle modifications of several degrees can be effected at intervals of a few minutes. This may be somewhat detrimental to accuracy, but in many cases it ensures the continued operation of the installation.

The various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for operating a wind power installation, the wind power installation having an aerodynamic rotor having rotor blades of adjustable blade angle, the wind power installation being controlled by an operation control system, and the wind power installation being configured to generate an installation power, the method comprising:
   activating a blade-angle adaptation routine when an ice accretion situation occurs, when ice accretion on the rotor blades has been detected or is expected, and
   modifying a collective blade angle of the rotor blades using the blade-angle adaptation routine, to adapt the rotor blades to an altered aerodynamic situation caused by the ice accretion situation, to increase the installation power, wherein the collective blade angle is modified to an aerodynamically improved blade angle, and wherein the aerodynamically improved blade angle is specified as an iced-blade angle,
   wherein, in the blade-angle adaptation routine, the iced-blade angle is sought by a search comprising:
      modifying the collective blade angle by a modification angle, starting from an initial angle;
      detecting a change in power as a resulting change in the installation power; and
      selecting the iced-blade angle in dependence on the modification angle and the change in power, such that the iced-blade angle is calculated as the sum of the initial angle and an offset angle that is dependent on the change in power.

2. The method as claimed in claim 1, wherein the iced-blade angle is specified as a minimum blade angle to be exceeded, but not undershot.

3. The method as claimed in claim 1, wherein, in the blade-angle adaptation routine,
   the offset angle is proportional to a quotient of the change in power and the modification angle.

4. The method as claimed in claim 1, wherein, in a search performed by the blade-angle adaptation routine for determining the iced-blade angle:
   the offset angle is selected in dependence on the modification angle of the modification of the collective blade angle and a resulting change in installation power,
   the offset angle is formed from a product of either:
      a gain factor and the change in installation power, or
      the gain factor and a relative change in power formed as a quotient of the change in installation power and the modification angle, and the gain factor is selected in dependence on a wind velocity prevailing at the wind power installation, such that the lower the wind velocity, the greater is the gain factor selected.

5. The method as claimed in claim 1, wherein, in a search performed by the blade-angle adaptation routine,
the collective blade angle is modified incrementally by the modification angle, starting from the initial angle,
the modification angle being selected in dependence on the initial angle such that the smaller the initial angle, the larger is the modification angle selected in terms of magnitude.

6. The method as claimed in claim 1, wherein, in a search in the blade-angle adaptation routine,
with simultaneous monitoring of the installation power, starting from the initial angle, the collective blade angle:
is increased in an increase step and then reduced back to the initial angle, and
is reduced in a reduction step and then increased back to the initial angle.

7. The method as claimed in claim 6, wherein,
in an increase search, the increase step is performed before the reduction step, and
in a reduction search, the reduction step is performed before the increase step.

8. The method as claimed in claim 7, wherein the increase search and the reduction search are executed alternately and/or repeated at predetermined repetition intervals, or only the increase step is performed.

9. The method as claimed in claim 1, wherein, in a search performed by the blade-angle adaptation routine, a modification of the collective blade angle is effected in dependence on specified minimum blade angles such that:
one or more minimum blade angles specified by the operation control system is or are ascertained, and a reduction of the collective blade angle by a modification angle is performed only if none of the ascertained minimum blade angles is undershot, an already specified iced-blade angle not being considered as an ascertained minimum blade angle.

10. The method as claimed in claim 9, wherein in the search only one increase step is performed at a time, in which the collective blade angle is increased starting from the initial angle and then reduced back to the initial angle.

11. The method as claimed in claim 1, wherein,
in the blade-angle adaptation routine,
a search for finding the iced-blade angle is repeated at predeterminable time intervals, wherein:
the predetermined time intervals are in the range of from 30 to 600 seconds, and/or
a previously determined iced-blade angle is used as the initial angle in repetition of the search, and/or
after each search, the offset angle is calculated and the previous iced-blade angle is modified by the offset angle, and the offset angle is limited to a maximum offset angle in each case, the maximum offset angle being in the range of from 0.5° to 2°.

12. The method as claimed in claim 11 wherein the predetermined time intervals are in the range of from 60 to 120 seconds and the maximum offset angle is in the range of from 0.75° to 1.5°.

13. The method as claimed in claim 12 wherein the maximum offset angle is 1°.

14. The method as claimed in claim 1, wherein the blade-angle adaptation routine is activated only when ice accretion has been detected, and/or an ambient temperature of the wind power installation is in a range in which ice accretion may occur, sensing of the ambient temperature is performed and the blade-angle adaptation routine is effected in dependence on the sensed ambient temperature, and/or the blade-angle adaptation routine is activated only when ice accretion is detected by comparison with an installation characteristic curve.

15. The method as claimed in claim 1, wherein the blade-angle adaptation routine and/or a search are executed only when at least one of the following conditions is fulfilled:
condition 1: at least a minimum wait time, which is in the range of from 30 seconds to 5 minutes, has elapsed since a last search,
condition 2: the wind power installation is in an automatic mode in which automatic modifications of an operating point are enabled,
condition 3: ice accretion is detected by comparison of a current operating point with an installation characteristic curve, if a minimum deviation is reached or exceeded, or if the iced-blade angle is above another minimum blade angle,
condition 4: a prevailing wind velocity in the region of the wind power installation is above a specifiable minimum wind velocity, above 2 m/s,
condition 5: a mean collective blade angle is below a specifiable minimum blade-angle limit value, below 30°,
condition 6: an azimuth search, for searching an optimal azimuth orientation of the wind power installation, is inactive for a specifiable inactivity time, for at least 10 seconds,
condition 7: the current output power complies with a specifiable amount of power fluctuation, for at least 60 seconds the output power does not differ by more than 15% from a moving average value of the output power over 1 minute, and
condition 8: the current collective blade angle complies with a specifiable amount of fluctuation of the blade angle, the collective blade angle does not differ by more than 0.5° from a moving average value of the collective blade angle of the last 30 seconds.

16. The method as claimed in claim 15, wherein:
condition 4 includes a prevailing wind velocity in the region of the wind power installation is above a specifiable minimum wind velocity above 2.5 m/s,
condition 5 includes a mean collective blade angle is below a specifiable minimum blade-angle limit value below 20°,
condition 6 includes an azimuth search, for searching an optimal azimuth orientation of the wind power installation, is inactive for a specifiable inactivity time for at least 20 seconds,
condition 7 includes the current output power complies with a specifiable amount of power fluctuation, wherein for at least 60 seconds the output power does not differ by more than 10% from a moving average value of the output power over 1 minute.

17. The method as claimed in claim 16 wherein condition 7 includes the current output power complies with a specifiable amount of power fluctuation, wherein for at least 60 seconds the output power does not differ by more than 5% from a moving average value of the output power over 1 minute.

18. The method as claimed in claim 1, wherein:
checking for ice accretion is effected by comparison with an installation characteristic curve, in which an operating point is compared with an installation characteristic curve, the installation characteristic curve representing a relationship between installation power and wind velocity, and/or a relationship between collective blade angle and wind velocity, and ice accretion is assumed if a minimum deviation from the installation characteristic curve has occurred at a sensed wind velocity, in which a current operating point has an installation power that deviates from the installation power of the installation characteristic curve of the sensed wind velocity by at least a power tolerance amount, or the current operating point has a collective blade angle that deviates from the collective blade angle of the installation characteristic curve of the sensed wind velocity by at least an angle tolerance amount, wherein ice accretion is assumed only when the minimum deviation from the installation characteristic curve has occurred at least for a predetermined minimum number of times, wherein the minimum number is in the range of from 3 to 10.

19. The method as claimed in claim 18 wherein the minimum number is 5.

20. A wind power installation, comprising:

an aerodynamic rotor having rotor blades of adjustable blade angle, wherein the wind power installation is controlled by an operation control system, wherein the wind power installation is configured to generate an installation power, wherein the wind power installation is configured to execute a method comprising:

activating a blade-angle adaptation routine when an ice accretion situation occurs, when ice accretion on the rotor blades has been detected or is expected, and modifying a collective blade angle of the rotor blades using the blade-angle adaptation routine, to adapt the rotor blades to an altered aerodynamic situation caused by the ice accretion situation, to increase the installation power, wherein the collective blade angle is modified to an aerodynamically improved blade angle, and wherein the aerodynamically improved blade angle is specified as an iced-blade angle, wherein, in the blade-angle adaptation routine, the iced-blade angle is sought by a search comprising:

modifying the collective blade angle by a modification angle, starting from an initial angle;

detecting a change in power as a resulting change in the installation power; and selecting the iced-blade angle in dependence on the modification angle and the change in power, such that the iced-blade angle is calculated as the sum of the initial angle and an offset angle that is dependent on the change in power.

\* \* \* \* \*